(12) United States Patent
Noy et al.

(10) Patent No.: US 7,526,685 B2
(45) Date of Patent: **\*Apr. 28, 2009**

(54) APPLICATION MANAGER FOR MONITORING AND RECOVERY OF SOFTWARE BASED APPLICATION PROCESSES

(75) Inventors: Oded Noy, Los Angeles, CA (US); Brian Maso, Laguna Niguel, CA (US)

(73) Assignee: Path Reliability, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/376,750

(22) Filed: Mar. 14, 2006

(65) Prior Publication Data

US 2006/0253745 A1   Nov. 9, 2006

Related U.S. Application Data

(63) Continuation of application No. 09/964,265, filed on Sep. 25, 2001, now Pat. No. 7,028,225.

(51) Int. Cl.
*G06F 11/00* (2006.01)
(52) U.S. Cl. .......................................... 714/47; 702/186
(58) Field of Classification Search ................... 714/47, 714/38; 702/186; 717/120, 128, 127, 124, 717/126
See application file for complete search history.

(56) References Cited

U.S. PATENT DOCUMENTS 4,490,817 A * 12/1984 Turner ........................ 370/244

| 4,845,615 A | 7/1989 | Blasciak |
| 5,047,919 A | 9/1991 | Sterling et al. |
| 5,193,179 A | 3/1993 | Laprade et al. |

(Continued)

FOREIGN PATENT DOCUMENTS

EP   1061445   12/2000

(Continued)

OTHER PUBLICATIONS

Sharma et al., "Run-Time Monitoring of Concurrent Programs on the Cedar Multiprocessor", Nov. 1990, IEEE Computer Society, pp. 784-793.

(Continued)

*Primary Examiner*—Dieu-Minh Le
(74) *Attorney, Agent, or Firm*—Liu & Liu

(57) ABSTRACT

A constant monitoring and recovery system that enables the measurement of task usage/metrics and performance of software-based business applications. These metrics can then be evaluated by logic, in combination with each other and/or a timer, in a distributed environment. This is accomplished with the introduction of an extremely low overhead to the application host. The results of the logic evaluation can cause real-time and real-world responses such as application restart, interaction with load balancing equipment, or notification (via email, pager, etc.). Data can also be persisted to a database for later archival or evaluation, with the ability to reduce granularity over time. Specifically, an application manager monitors business application processes, notifies failure and automatically recovers software based business applications based on the logic of the underlying applications. The application manager comprises three main components that work together: Instrumentation API for setting up monitoring parameters; Event Notification and Automatic Recovery Evaluation Engine; Monitoring Console Server.

22 Claims, 12 Drawing Sheets

U.S. PATENT DOCUMENTS

| | | | |
|---|---|---|---|
| 5,450,586 A | 9/1995 | Kuzara et al. | |
| 5,608,894 A | 3/1997 | Kawakami et al. | |
| 5,732,273 A | 3/1998 | Srivastava et al. | |
| 5,774,660 A | 6/1998 | Brendel et al. | |
| 5,790,858 A | 8/1998 | Vogel | |
| 5,872,909 A | 2/1999 | Wilner et al. | |
| 5,956,720 A | 9/1999 | Fernandez et al. | |
| 5,987,249 A | 11/1999 | Grossman et al. | |
| 6,061,724 A | 5/2000 | Ries et al. | |
| 6,085,029 A | 7/2000 | Kolawa et al. | |
| 6,128,279 A | 10/2000 | O'Neil et al. | |
| 6,138,159 A | 10/2000 | Phaal | |
| 6,144,962 A | 11/2000 | Weinberg et al. | |
| 6,167,358 A | 12/2000 | Othmer et al. | |
| 6,182,139 B1 | 1/2001 | Brendel | |
| 6,186,677 B1 | 2/2001 | Angel et al. | |
| 6,260,187 B1 | 7/2001 | Cirne | |
| 6,263,298 B1 | 7/2001 | Kerman et al. | |
| 6,332,213 B1 | 12/2001 | Grossman et al. | |
| 6,356,859 B1 | 3/2002 | Talbot et al. | |
| 6,405,327 B1 | 6/2002 | Sipple et al. | |
| 6,564,174 B1 * | 5/2003 | Ding et al. | 702/186 |
| 6,587,970 B1 * | 7/2003 | Wang et al. | 714/47 |
| 6,633,782 B1 * | 10/2003 | Schleiss et al. | 700/26 |
| 6,701,363 B1 * | 3/2004 | Chiu et al. | 709/224 |
| 6,748,555 B1 * | 6/2004 | Teegan et al. | 714/38 |
| 6,754,612 B1 * | 6/2004 | Vanfladern et al. | 702/186 |
| 6,760,903 B1 | 7/2004 | Morshed et al. | |
| 6,816,898 B1 * | 11/2004 | Scarpelli et al. | 709/224 |
| 6,845,474 B2 * | 1/2005 | Circenis et al. | 714/48 |
| 7,024,594 B2 * | 4/2006 | Pignol | 714/54 |
| 7,202,041 B2 * | 4/2007 | Kamei et al. | 435/7.1 |
| 2002/0087383 A1 | 7/2002 | Cogger et al. | |
| 2003/0061333 A1 * | 3/2003 | Dean et al. | 709/223 |
| 2004/0030531 A1 | 2/2004 | Miller et al. | |

FOREIGN PATENT DOCUMENTS

| | | |
|---|---|---|
| EP | 1061446 | 12/2000 |

OTHER PUBLICATIONS

Wybranietz et al., "Monitoring and Performance Measuring Distributed System During Operation", 1988, ACM Press, 1988 ACM Sigmetrics, pp. 197-206.

* cited by examiner

P.A.M. Log Handling

* Refer to U.S. Patent Application 09/596,763

APPLICATION MANAGER FOR MONITORING AND RECOVERY OF SOFTWARE BASED APPLICATION PROCESSES

This is a continuation application of co-pending U.S. application Ser. No. 09/964,265, entitled "Application Manager for Monitoring and Recovery of Software Based Application Processes", filed on Sep. 25, 2001, which is hereby incorporated by reference as if fully set forth herein.

BACKGROUND OF THE INVENTION

1. Field of the Invention

The present invention is directed to a system for monitoring and recovery of software based application processes. More particularly, a system for automatically restarting software applications and providing failure notification for automated business processes, and providing tracing of performance and availability of the applications, and service level management.

2. Description of Related Art

The popularity of the Internet fueled a great demand in business-to-business and business-to-consumer Internet applications. Many organizations have established Web-based distributed applications for dissemination or collection of information, or to extend remote access and command capabilities of processes through Web-based interfaces. For example, a merchant's web system allows consumers to purchase items online, and pay with a credit card. Credit card transactions are processed by communication with an outside system belonging to a third party.

The tremendous expansion of the Internet has also changed the paradigm of implementation and deployment of software applications and expanded the number and features in software applications. For example, Application Service Providers (ASPs) operate and maintain software application at remote web sites and as part of their product offerings, make those software applications available to users via the Internet.

For distributed network systems, several protocols exist in which one computer system (a "host" system) receives and processes messages from a number of other computer systems ("client" systems). In the example of the World Wide Web ("WWW"), in the simplest network configuration, one server would be the host system while each personal computer would be a client system. If a web site is very popular, or otherwise has large volume of traffic, the host operations may fail due to a system overload. To address this problem, load directions or load balancing techniques have been developed, by which several servers are arranged in parallel, and arrangements implemented for distributing work among them. Distribution of work, where a received message is allocated to a particular host computer, is often referred to as load directions or load balancing.

Other prior art systems remotely monitor network systems to provide failure notification based on certain triggering events, or to avoid system overload. However, developers working on building software systems have limited access into the performance of various components, and must often rely on sorting through log files or devising tests to determine various levels of functionality. Further, when the system is "live" and in use, most of the currently available monitoring tools only report on basic hardware performance metrics such as CPU usage, or the receipt of a response from "ping-ing" a port on a given machine. There is no way to monitor the level of performance of the actual business logic of an application, or the details of interactions with other external applications.

None of the prior art systems perform failure notification and automatic recovery based on logical evaluation of the monitoring data they receive.

Accordingly, there is a need for a system and method for remotely monitoring the network, which avoid these and other problems of known systems and methods.

SUMMARY OF THE INVENTION

The present invention is directed to a constant monitoring and recovery system that enables the measurement of task usage/metrics and performance of software-based business applications. These metrics can then be evaluated by logic, in combination with each other and/or a timer, in a distributed environment. This is accomplished with the introduction of an extremely low overhead to the application host. The results of the logic evaluation can cause real-time and real-world responses such as application restart, interaction with load balancing equipment, or notification (via email, pager, etc.). Data can also be persisted to a database for later archival or evaluation, with the option to reduce the granularity over time.

Specifically, the present invention provides an application manager that monitors business application processes, notifies failure and automatically recovers software-based business applications based on the logic of the underlying applications.

In one aspect of the present invention, extensive monitoring and reporting capabilities are provided to allow developers of software systems to have greater access into the performance of various components of the software system, and to determine various levels of functionality of the systems. This visibility, throughout the development, integration, and testing processes significantly reduces the time, effort, and cost of software development. Once deployed, this visibility turns the system from a "black box" (which can be tested only from the outside) into a "white box," with complete access to individual processes, users, and other performance metrics. A company needs this level of specificity to maintain service level contracts, upon which their income may well depend!

In another aspect of the present invention, a means for monitoring any desired metric of any software application is provided. For example, the level of performance of the actual business logic of an application and/or the details of interactions with other external applications are monitored when the software system is "live" and in use. This data is then collected, filtered, aggregated, or evaluated against logic—all based on whatever criteria the user specifies. All data is then persisted, as configured, to be available for historical as well as real-time reporting. An option is provided to persist data at decreasing levels of granularity over time, to avoid accumulating too much data in the database. For example, the system can be configured to save "per second" data for one day, "per minute" data for one week, and "per hour" data thereafter.

In a further aspect of the present invention, failure notification and recovery are performed based on logical evaluation of the monitoring data it receives. Real-world events can be initiated, such as restarting the application, with the possibility of performing a "soft shutdown" to further minimize service disruption and loss of transactions, and sending a notification via email or pager, etc.

The application manager in accordance with the present invention (referred herein as P.A.M.) is a constant monitoring and recovery tool comprised of three main components that work together:

(1) Instrumentation API for setting up monitoring parameters
(2) Event notification and automatic recovery evaluation engine (P.A.M. Engine)
(3) Monitoring using the P.A.M. Console Server The Instrumentation API Features:
Customizable API allows one to instrument and monitor unlimited tasks within standard or custom code
Instrumentation configuration may be modified in real time
Instrument anything (Java, Perl, Microsoft COM)
Instrument system performance metrics, including: SNMP statistics, Windows NT/2000, Perfmon metrics
Gather fine-grained metrics for specific ASP and JSP pages, Servlets, or EJB's within any enterprise.
Set metrics to create custom views to monitor activity specific to your enterprise.
Easily programmed to create "hooks" within in any application or server Some of the Benefits of the Instrumentation API Include:
Integrates easily at any stage within development or production cycle
Helps administrators to plan for overall improved performance
Minimize downtime, reducing operating costs and increasing customer satisfaction
Facilitate getting to market faster. P.A.M. helps to troubleshoot performance issues and pinpoint system bottlenecks and failure scenarios during development, testing, and production to save considerable time and effort.

The P.A.M. Engine (Notification and Automatic Recovery Evaluation) Features:
Processes information from the P.A.M. API and responds according to pre-programmed commands.
Forwards information to the P.A.M. Console Server for archiving and data mining.
Reduces application recovery from an average of 30 minutes to mere seconds, making almost all enterprise failures invisible to customers
Event Notification
Alerts system administrator when performance thresholds are reached or when a compete restart of a failed application is necessary. Notifications occur instantly via console, e-mail, pager, and phone.
Soft shutdown will stop an application in stages, keeping transactions from getting lost and ensuring enterprise reliability and availability
Requires minimal CPU usage. P.A.M. will not tax system resources when in production. Its extremely thin application client utilizes less than 2% of the CPU, even when under heavy load conditions.

Some of the Benefits of the P.A.M. Engine Include:
P.A.M. catches system failures before users do; it then recovers system failure so quickly that users never know anything went wrong.
The result is assured end-user satisfaction The P.A.M. Console Server Features:
At-a-glance functionality, for both immediate activity and historical data
Create personalized "dashboard" views according to individual administrative roles and security access levels
Select what information and performance data can be accessed remotely
View all data securely in real time via any web browser Some of the benefits of P.A.M. Console Server Include:
The easy to use, intuitive P.A.M. Console provides access to performance data from anywhere, at any time, and configurable according to the system requirements.
P.A.M. is able to detect application errors and problems almost all the time. Downtime can be predicted and minimized to several seconds when failure occurs.

In addition to the Foregoing Components, the P.A.M. System Provides for Data Logging and Mining, Featuring:
Record system metrics including alerts, restart time, performance and reliability data to nearly any database including Oracle and Microsoft SQL Server
Forward all data to a Central Logging Server for event logging and data mining
Provide smart archiving features. Data is stored with finer granularity closer to the event and lesser granularity as time goes by. For example, the system will keep "per second" data for the first 24 hours, then compute the average to store "per minute" data for one week, and then "per hour" after that. All values are configurable in the system. Important values that represent exceptions of high severity may be separately configured to be kept for a longer period of time.

Some of the Benefits of Data Logging and Mining Include:
Assist administrators with resource allocation planning
Assist engineers with invaluable performance and behavior data
Keep accurate and detailed records of enterprise functionality for constant tracking and improvement
Prevent performance problems by recognizing and correcting the conditions that lead to application failures These and other functions, features and advantages of the present invention will become more apparent in the detail description below.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE EMBODIMENT OF THE INVENTION

Figure 1:
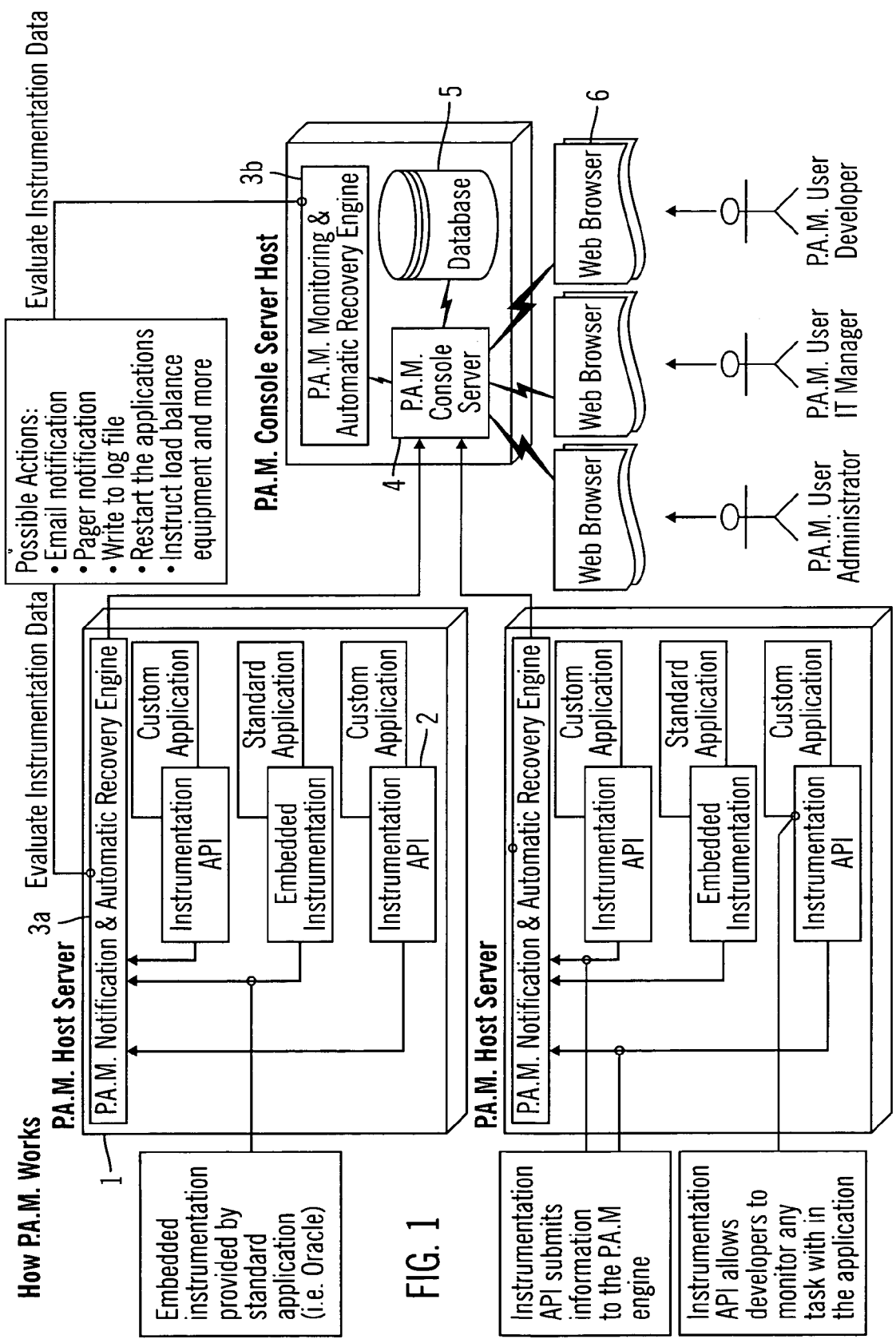
FIG. 1 is a schematic diagram providing a high-level overview of the physical location of the primary components of the present invention, and the interactions between them.

The present description is of the best presently contemplated mode of carrying out the invention. This description is made for the purpose of illustrating the general principles of the invention and should not be taken in a limiting sense. The scope of the invention is best determined by reference to the appended claims.

The present invention substantially reduces the difficulties and disadvantages associated with prior art monitoring and failure recovery systems. To facilitate an understanding of the principles and features of the present invention, they are explained herein below with reference to its deployments and implementations in illustrative embodiments. By way of example and not limitation, the present invention is described herein below in reference to examples of deployments and implementations in the Internet environment. The present invention can find utility in a variety of implementations without departing from the scope and spirit of the invention, as will be apparent from an understanding of the principles that underlie the invention.

Information Exchange Network

The detailed descriptions that follow are presented largely in reference to examples relating to information handling devices and information exchange systems in terms of methods or processes and symbolic representations of operations within information handling devices. These method descriptions and representations are the means used by those skilled in the data processing arts to most effectively convey the substance of their work to others skilled in the art.

A method or process is here, and generally, conceived to be a self-contained sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices. In short, use of the methods described and suggested herein is not limited to a particular processing configuration.

The application manager system in accordance with the present invention may be implemented to monitor and recover software based business applications in, without limitation, distributed information exchange networks, including public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects. Prior to discussing details of the inventive aspects of the present invention, it is helpful to discuss one example of a network environment in which the present invention may be implemented.

Figure 11:
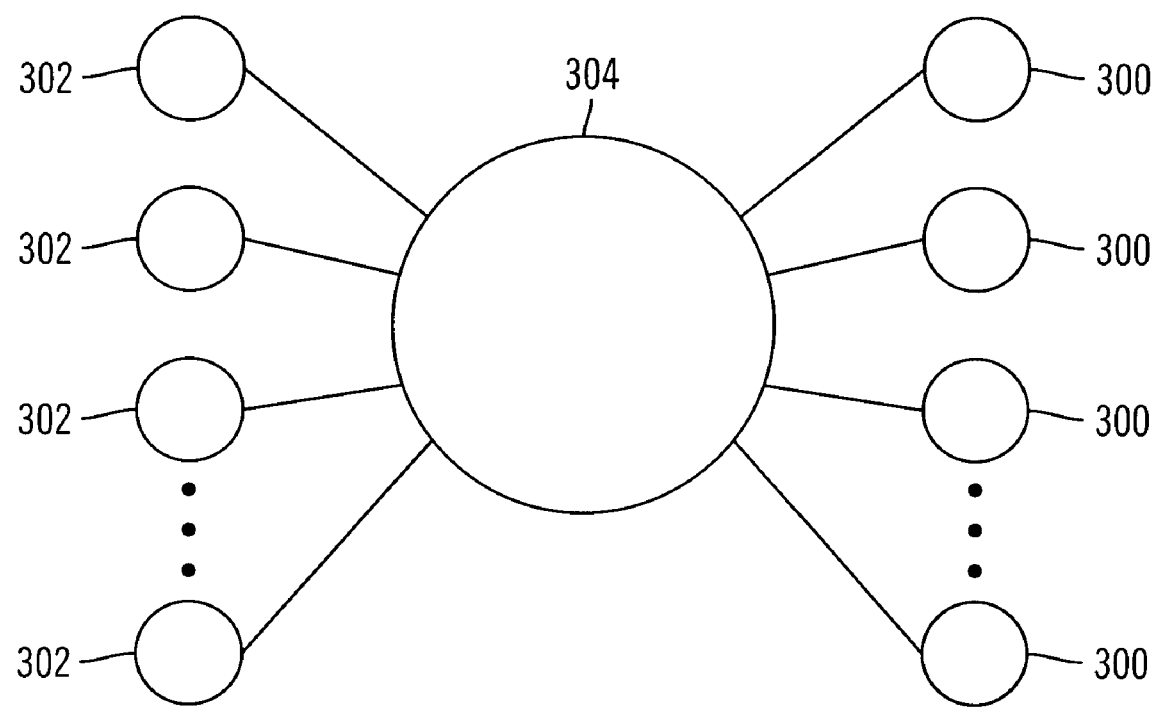
FIG. 11 is a schematic diagram representing the Internet as an example of a distributed information exchange network.

The Internet is an example of an information exchange network including a computer network in which the present invention may be implemented, as illustrated schematically in FIG. 11. Many servers 300 are connected to many clients 302 via Internet network 304, which comprises a large number of connected information networks that act as a coordinated whole. Details of various hardware and software components comprising the Internet network 304 are not shown (such as servers, routers, gateways, etc.), as they are well known in the art. Further, it is understood that access to the Internet by the servers 300 and clients 302 may be via suitable transmission medium, such as coaxial cable, telephone wire, wireless RF links, or the like. Communication between the servers 300 and the clients 302 takes place by means of an established protocol. As will be noted below, the software based business applications and various components of the application manager system of the present invention may be configured in or as one or more of servers 300. Users may access the applications via clients 302. Some of the clients 302 and servers 300 may function as a client and/or server to other client(s) and/or server(s).

System Overview

The present invention is directed to a system for automatically restarting and providing failure notification for automated business processes in software applications. Although the invention will be described in the context of the World Wide Web, and more specifically in the context of online enterprise applications, it is not limited to use in this context. Rather, the invention can be used in a variety of different types of software use. For example, the invention can be used with distributed transaction computing and Enterprise Application Integration (EAI), to name a few.

The included diagrams refer to the invention as P.A.M. P.A.M. is the Path Application Manager that monitors software applications, which is developed by Path Communications Inc., the assignee of the present invention.

P.A.M. is a constant monitoring and recovery tool comprised of three main components that work together:
  (1) Instrumentation API for setting up monitoring parameters
  (2) Event notification and automatic recovery evaluation engine
  (3) Monitoring using the P.A.M. Console Server (1) Instrumentation Application Programming Interface (API)

The Instrumentation API is easily programmed to create "hooks" to monitor unlimited tasks in a standard or custom application. Administrators set parameters or metrics to create customized views that monitor the activity specific to their enterprise. Such metrics include load variations, average response time specific to a task occurring outside of the web page, and other enterprise specific issues. Specific risk and problem areas of any application can be easily identified and anticipated using P.A.M. Administrators can also set metrics to respond only when a prescribed threshold is reached. In this way, non-critical problems are addressed at low traffic times.

Key Points about the Instrumentation API are:
Can instrument anything (Java, Perl, MicrosoftCOM)
Easy to integrate and use
Works on any application and server
Enables administrators to plan for overall improved performance
Can be integrated at any stage within the development or production cycle (2) Notification and Auto Recovery Evaluation Engine (The P.A.M. Engine)

The P.A.M. Engine takes information from the Instrumentation API, evaluates it, and then takes the appropriate pre-programmed action. It also forwards the appropriate information to the P.A.M. Console Server for archiving and data mining to assist administrators with resource allocation planning and to assist engineers with invaluable performance and behavior data. The application may be recycled, halted and started again and administrators will be automatically notified of the problem by pager, e-mail or cell phones.

P.A.M. also offers a "soft shutdown" that will stop an application in stages, allowing ongoing operations to complete. This allows, for example, an in process credit card transaction to go through before shutdown, thus decreasing end user frustration. Furthermore, most failures require 30 minutes or more for recovery while P.A.M. decreases recovery time to less than ten seconds. In fact, recovery is so fast that users using applications monitored by P.A.M. do not know when failures occur.

Key Points about the P.A.M. Engine:
Allows administrators to preprogram responses to enterprise events, based on information supplied by the Instrumentation API
Notification in choice of methods
Performance friendly because it operates lightly under stress
The sophisticated yet easy-to-use scripting environment provides complete control for real-time reaction
Soft shutdown makes recovery seamless
Reduces application recovery time to seconds, making enterprise failures invisible to users
Smart archiving, so that data is kept in fine granularity for a set period of time.
This way the important data is maintained without overloading the database.

(3) Monitoring Using the Console Server

The P.A.M. Console Server provides an interactive display of enterprise metrics, giving a view of the enterprise's "health" at a glance both in real-time and historically. Views can be personalized according to individual administrative roles and security access levels. Administrators choose what information (such as performance data) should be accessible remotely and only that information is sent to the P.A.M. Console.

Key Points about the P.A.M. Console Server:
At a glance functionality, for both immediate activity and historical data
All data is viewed securely through the P.A.M. Console Server
Historical performance tracking makes data meaningful Other P.A.M. Features and Benefits:
Unlimited tasks within standard and custom code can be instrumented and monitored
Allows clients to customize metric gathering needs within any enterprise
Dramatically reduces time to market and ensures high quality throughout the application lifecycle
Increases system maturity curve by assisting system administrators and engineers pinpoint system performance bottlenecks and failure scenarios Built in Java, P.A.M. is platform agnostic and seamless to integrate
P.A.M. Central Logging Server and Console allows monitoring of enterprises remotely and securely via any web browser
Designed to minimize effect on system even in production under heavy load conditions
P.A.M. is an affordable, cost effective solution
Constant enterprise monitoring gives clients peace of mind by assuring application reliability and availability, preventing downtime-related loss of revenue

EXAMPLE

The following is a simple, common example of the present invention working in a real life environment:

A merchant's web server allows consumers to purchase items online, and pay with a credit card. Credit card transactions are processed by communication with an outside system belonging to a third party vendor. The web server is implement with the P.A.M. Automatic Recovery and Notification Engine (see disclosure below for details). When P.A.M. on the web server receives data from an instrument on that server about the current level of memory availability, it is checked against the configured parameters and responses of the transaction. If P.A.M. determines that the level of memory is critically low, the application would be restarted. More specifically, P.A.M. would first send an instruction to the load-balancing equipment not to send any new transactions. It would then monitor the communication with the outside credit-card processing system, waiting until all transaction in progress have been resolved. Only then would P.A.M. actually restart the application. When everything is back up and running, it would instruct the load-balancing equipment to begin sending new transactions again. As a result, the end-user would never be aware of the application shutdown. No transactions would be left hanging, with the consumer wondering if their credit card had been charged or not. No incomplete entries would exist in the system, costing time and money to track down with the third-party vendor.

Illustrated Embodiments

Turning now to the drawings, FIG. 1 provides an overview of the embodiment of the invention in an implementation of the Path Application Monitor (P.A.M.). Each application on a "Host Server" 1 is instrumented for monitoring. In some instances embedded tools present in the application are used, such as those provided by Microsoft, Oracle and other companies. Other applications may use other APIs such as SNMP or JMX. In other cases custom-coded instrument API's 2 are used. Data from these instruments is transmitted to the Notification and Automatic Recovery Engine 3a on the same server (see also FIGS. 7, 8, 9). This Engine transmits data to the P.A.M. Console Server 4, residing on its own host computer. The Console Server persists data to the database 5, as well as allowing viewing access to the data via a web browser 6, without the security risk of giving a user direct access to the application host. The Console Server also transmits data to its own Notification and Automatic Recovery Engine 3b. Only one Notification and Automatic Recovery Engine is needed per hardware box.

The Notification and Automatic Recovery Engine (3a and 3b) also evaluates the instrument data collected—singly, in combination, and with the aid of other criteria such as timers. By evaluating these measures compared to the specified criteria, the Engine will trigger real-world events such as restarting the application, notifying a contact via email or pager, writing the event to a log file, sending instructions to load-balancing equipment, etc.

Figure 2:
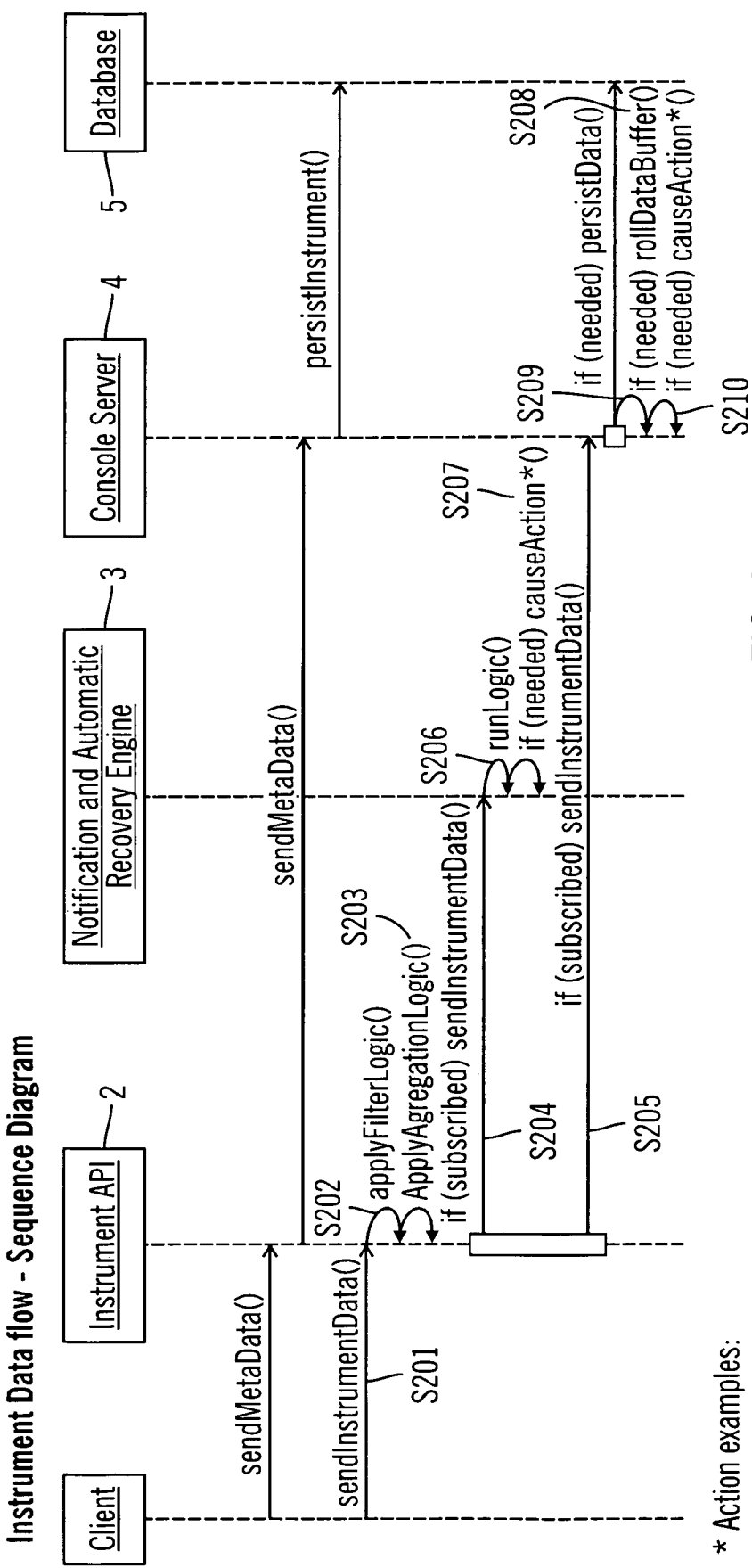
FIG. 2 is a data flow diagram illustrating the flow of the Instrument data between the various components of the inventions, and the logic performed at each step.

The flow of data through the components of the invention is detailed in reference to FIG. 2. Instrument data comes from the client to the Instrumentation API in step S201. After applying filtering logic in step S202 and aggregation logic in step S203 (see FIG. 3), the API sends data to the Notification and Automatic Recovery Engine (if it is subscribed) in step S204 as well as the Console Server (if subscribed) in step S205. The Notification and Automatic Recovery Engine runs its evaluation logic in step S206 (see FIG. 7). If needed, it then causes a real-world action in step S207. The Console Server persists the data to the database, if needed, in step S208. If needed, it will also roll the data buffer in step S209. Like the Notification and Automatic Recovery Engine, the Console Server may also cause real-world events if its specified criteria are met, in step S210.

Figure 3:
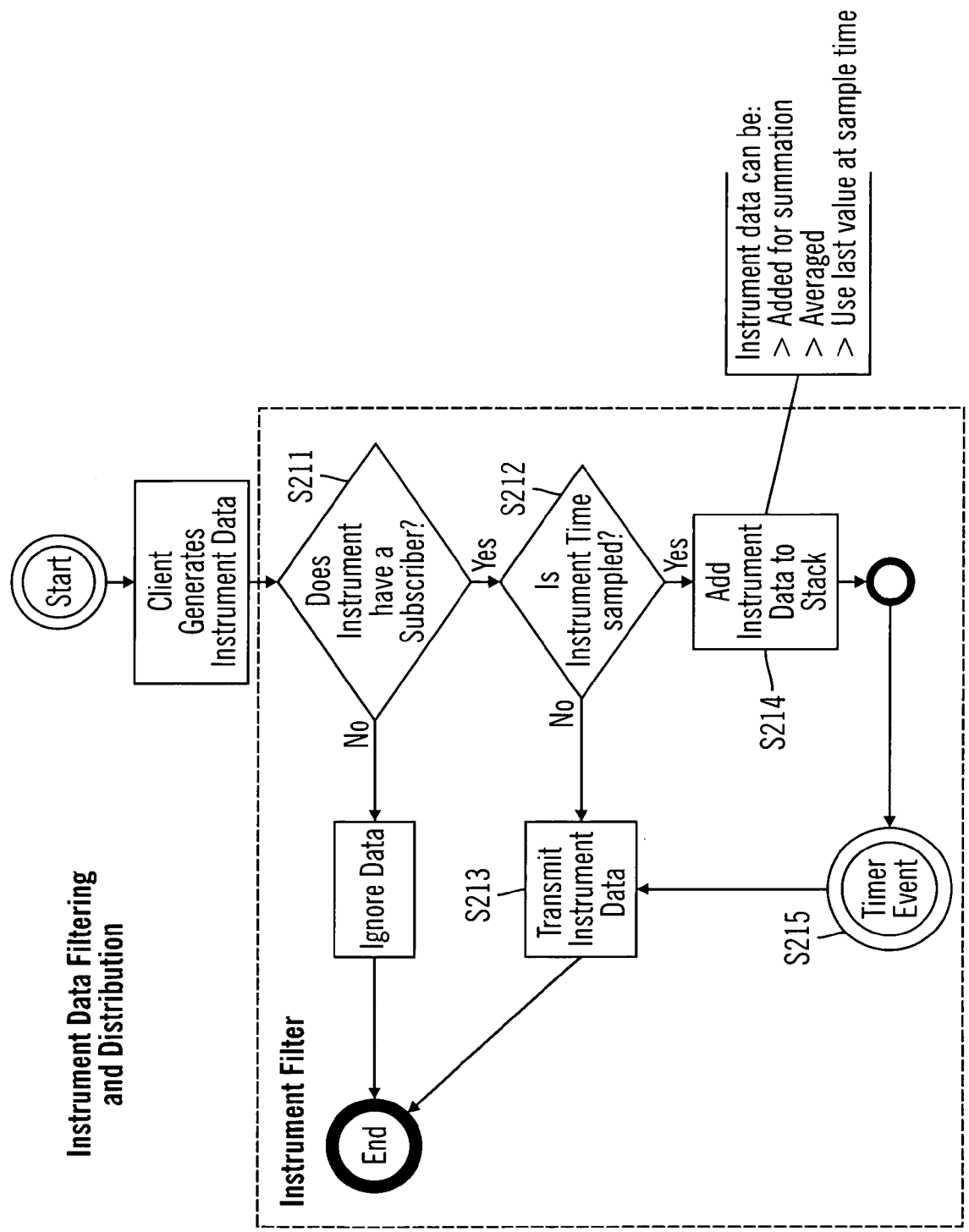
FIG. 3 is a flow diagram illustrating the process of applying all elements of filtering logic to the collected data.

FIG. 3 details the filtering and aggregation logic of the Instrumentation API. After instrument data is received from the client, a determination is made in step S211 as to whether there are any subscribers for that information. If not, the information is disregarded. If there is a subscriber, step S212 checks whether the instrument is time sampled. If not, the data is transmitted in step S213. For time-sampled data, the new information is added to the stack. In step S214, depending on the instrument's configuration, the data may be added for summation, averaged, or the last value at sample time can be used. When the timer event occurs in step S215, the instrument data is transmitted.

Figure 4A:
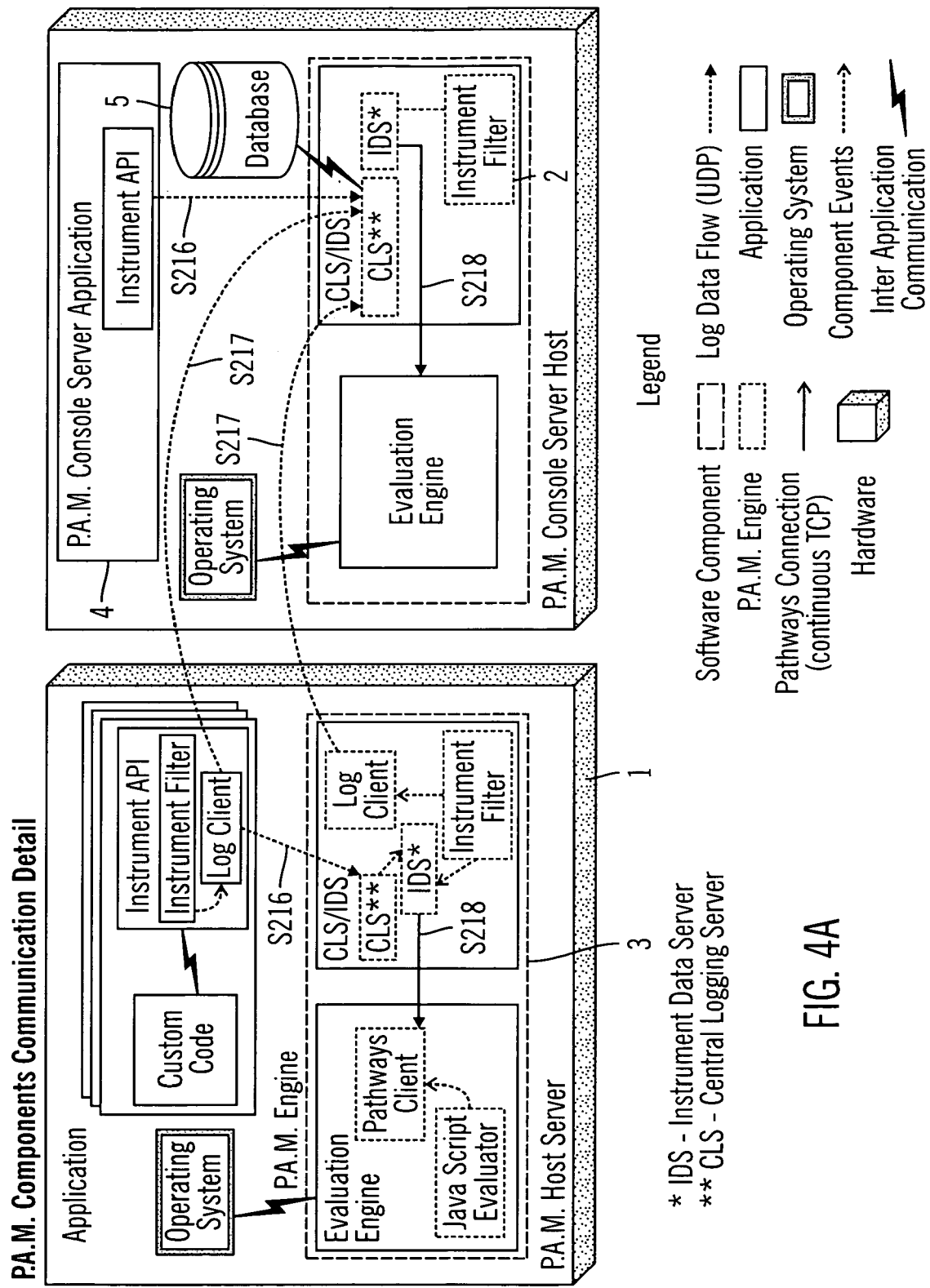
FIGS. 4a and 4b are schematic diagrams illustrating the communication between the invention's components, both the paths and the methods used.
Figure 4B:
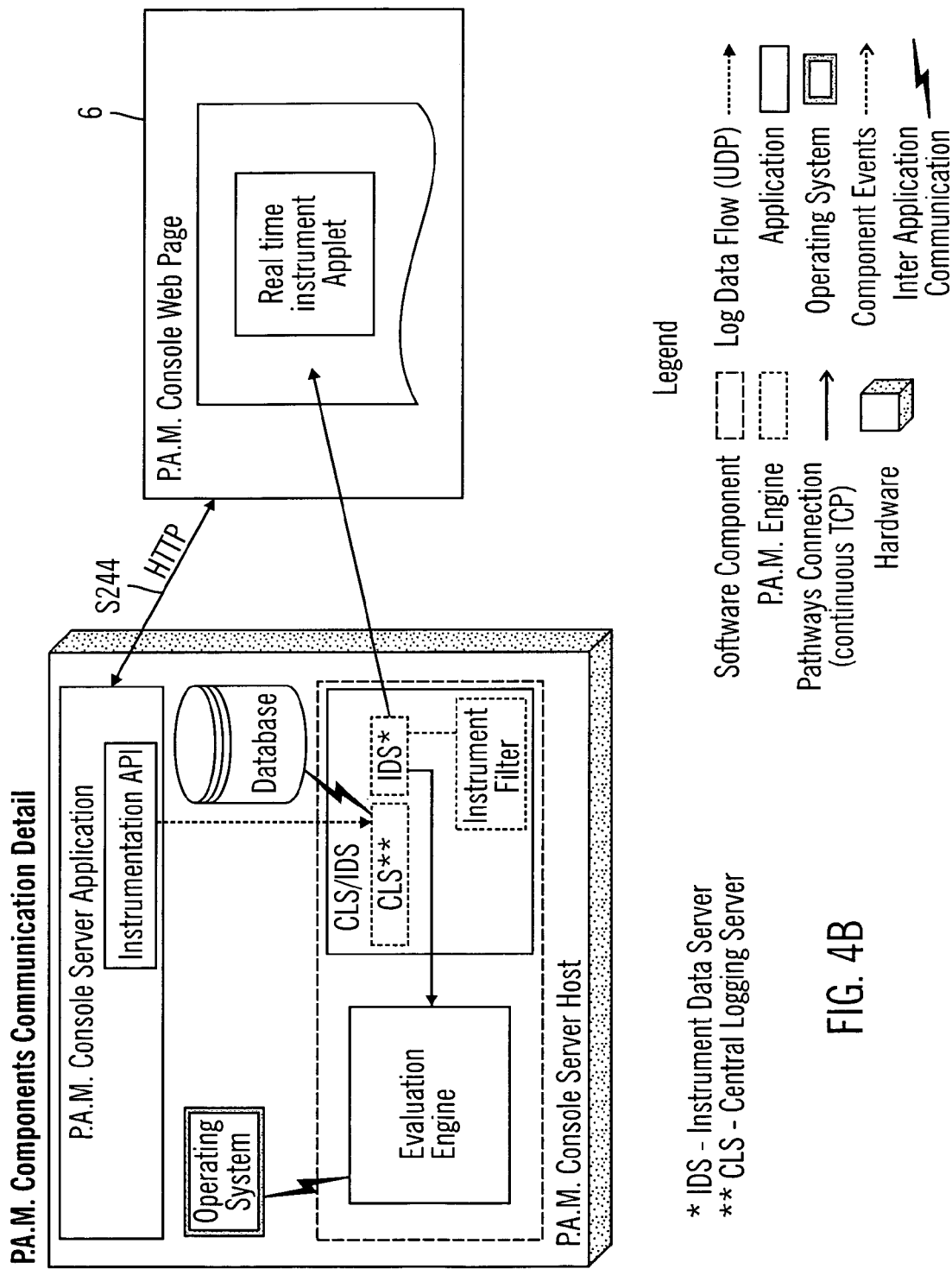

The communications between the invention's components, as highlighted in FIG. 1, are detailed specifically in FIGS. 4a and b. The invention uses two different modes of data transmission, for the most efficient and effective means of accomplishing its purposes. Packets sent between the Instrument API and the Automatic Recovery and Notification Engine in step S216, and between the Engine and the P.A.M. Console Server in step S217 utilize UDP. This asynchronous communication allows the minimum overhead to the host application, making it worth the trade-off of having no guarantee of delivery. Using UDP also reduces the security risk associated with a full TCP socket connection. The transmission destinations are also configurable, and may be sent to redundant boxes.

Within the P.A.M. Engine, information travels between the Instrument Data Server and the Evaluation Engine in step S218 over a continuous TCP connection to the Pathways server—as fully enumerated in U.S. patent application Ser. No. 09/596,763, which is fully incorporated by reference herein. This synchronous transmission ensures complete and sequential delivery of the data. HTTP Protocol is used in step S244 to allow access to Instrument meta-data, to the Console Server, and in a restricted form to each CLS/IDS for in-depth analysis by administrative staff.

Figure 5:
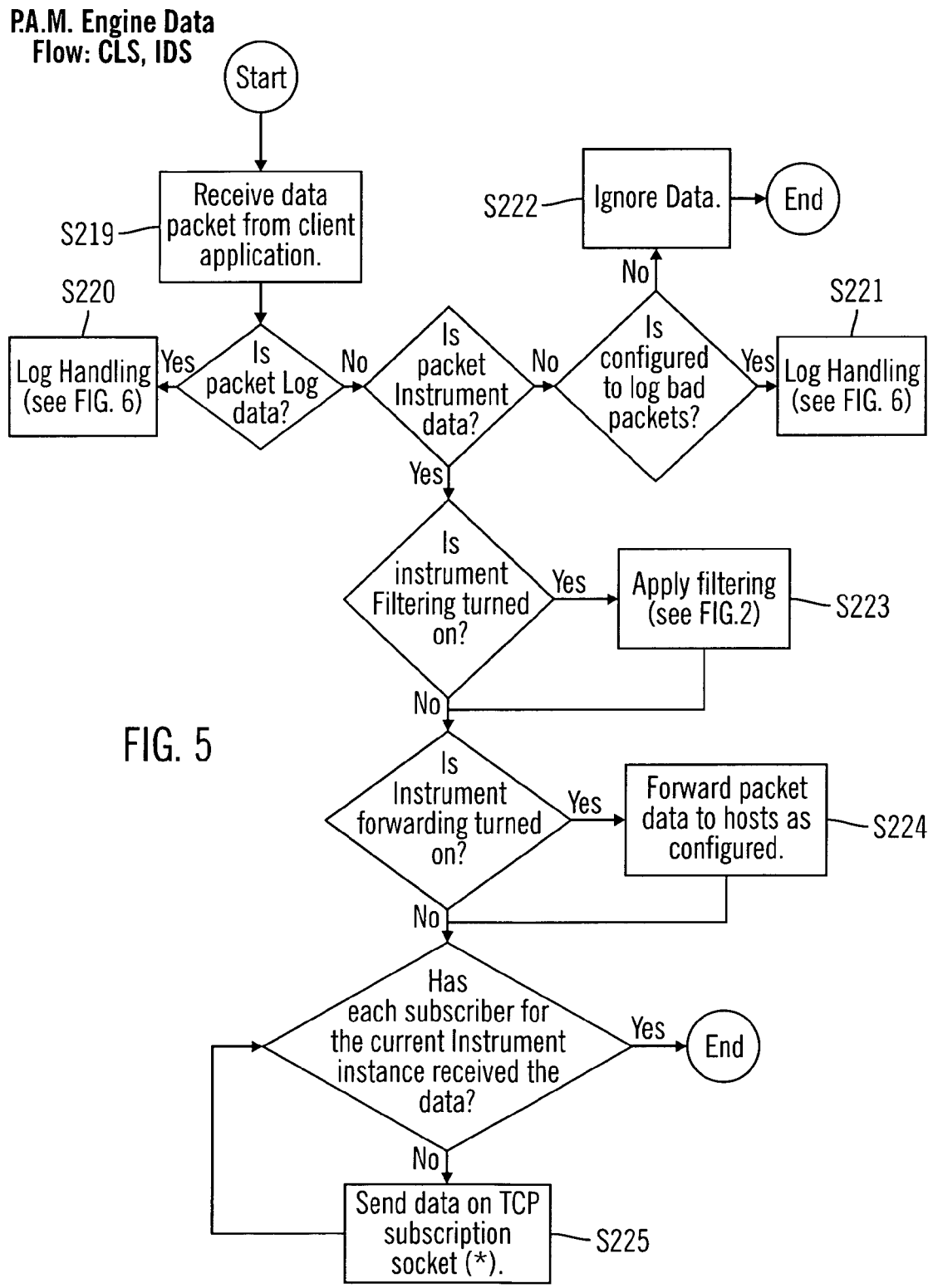
FIG. 5 is a flow diagram illustrating the process used by the P.A.M. Engine to handle Instrument data received.

FIG. 5 enumerates the flow of data after the Automatic Recovery and Notification Engine receives it from the Instrument API on a client application. Data packets are initially received by the Central Logging Server (CLS)/Instrument Data Server (IDS) in step S219. If the packet contains log data, it moves into the Log Handling process in step S220. If the packet is neither a log, nor instrument data, it is logged in step S221 if bad packets are logged, or ignored (step S222). If filtering is turned on, instrument data passes through the filtering process (see FIG. 3) in step S223. In step S224, the data is forwarded to hosts if the engine is configured for forwarding. In step S225, the data packet is then transmitted over a Pathways continuous TCP connection to each subscriber of the given instrument instance. Reference is made to co-pending U.S. patent application Ser. No. 09/596,763) regarding the continuous TCP connection.

Figure 6:
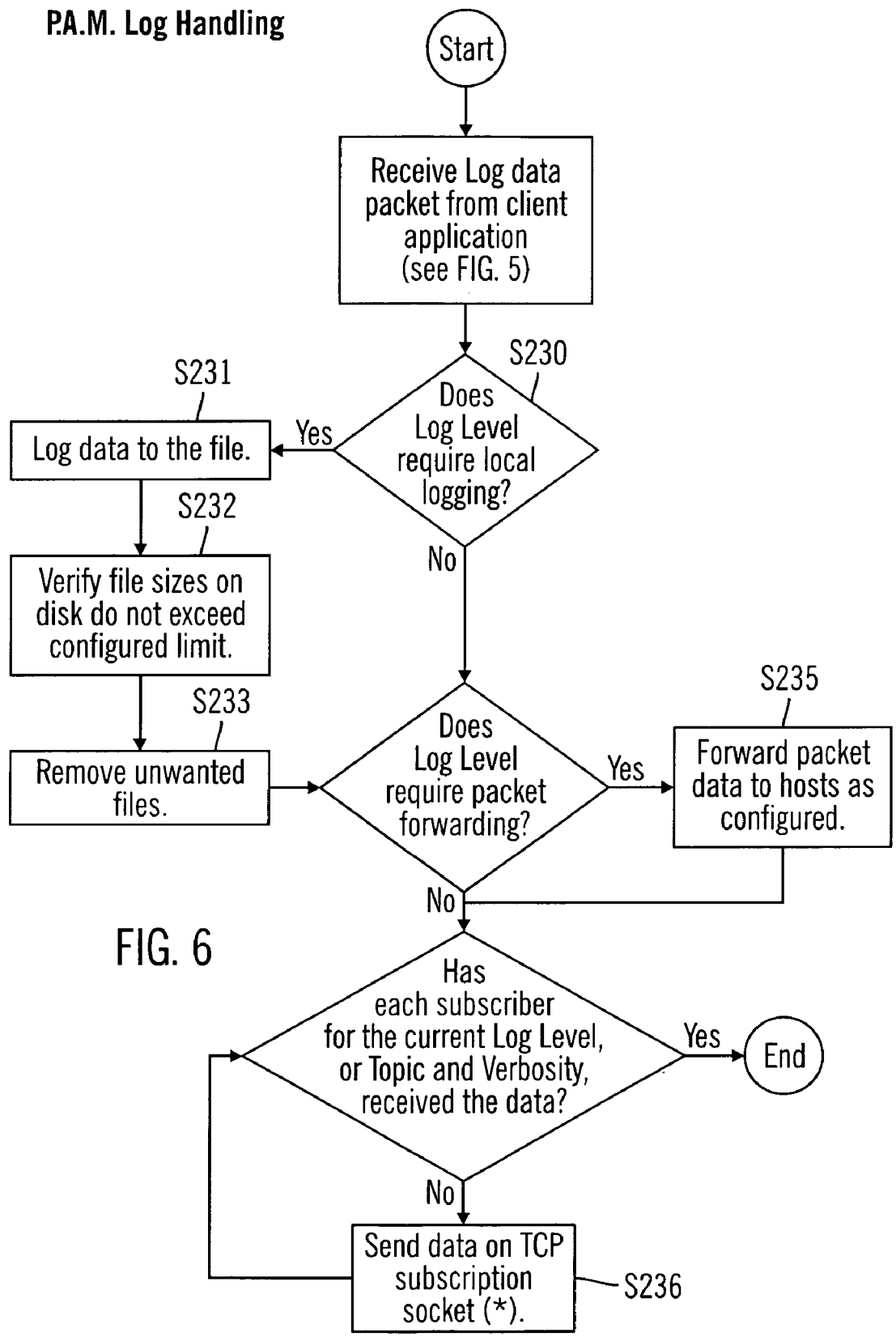
FIG. 6 is a flow diagram illustrating the process used for handling log data.

If the CLS/IDS invokes Log Handling in step S220 or S221 (see FIG. 5), the Log Client proceeds as shown in FIG. 6. The first determination, in step S230, is whether the Log Level requires local logging. If so, the data is logged to a file in step S231. In step S232, it is verified that the file sizes present on the disk do not exceed configured limits, and in step S233 unwanted files are removed. The next determination, made in step S234, is whether the Log Level requires packet forwarding. If so, the data is forwarded to hosts as configured, in step S235. Finally, in step S236, the data is transmitted over a Pathways continuous TCP connection (see U.S. patent Ser. No. 09/596,763) to each subscriber of the given Log Level, Topic, and Verbosity.

Figure 8:
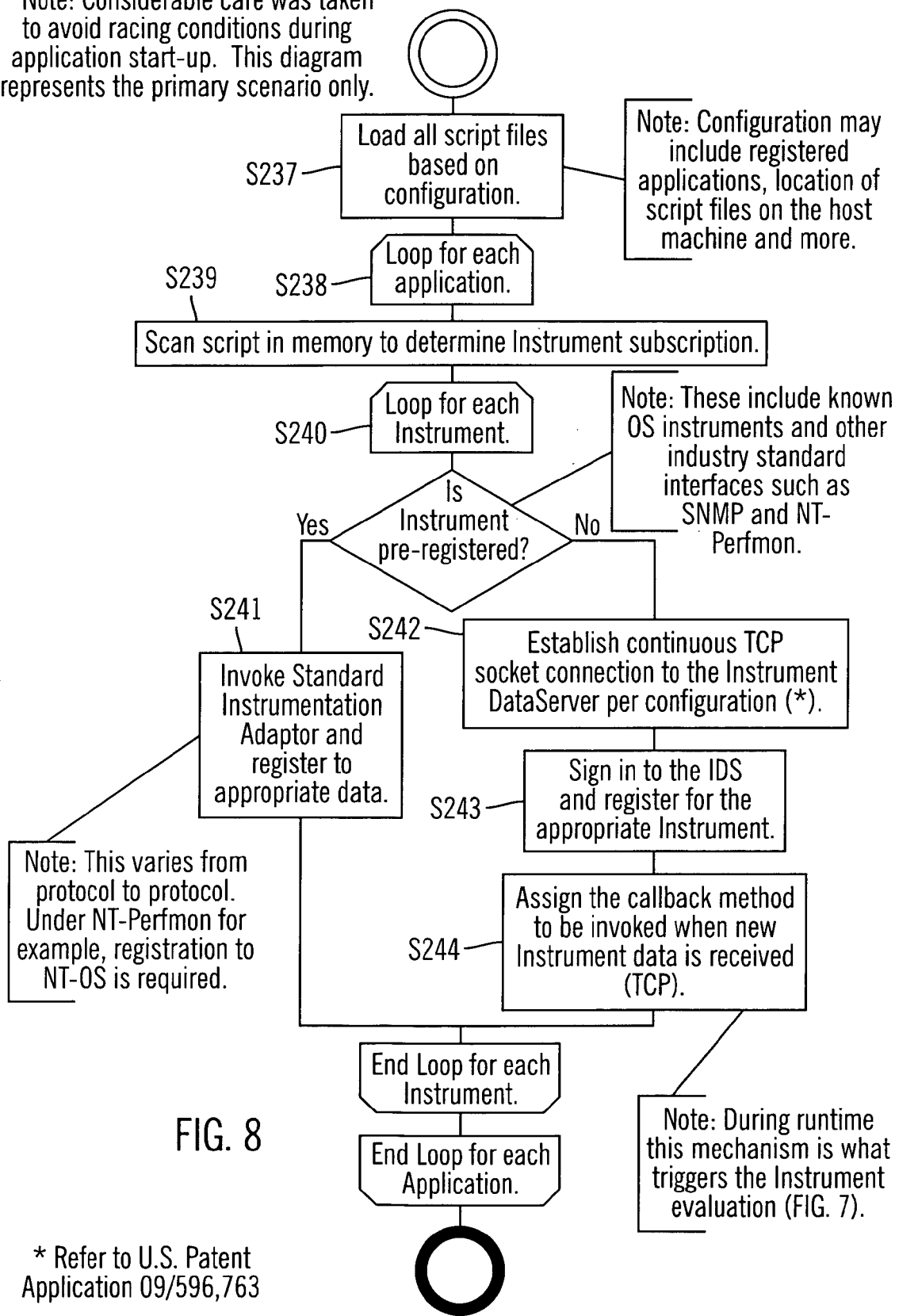
FIG. 8 is a flow diagram illustrating the process used at the initial start up of the Evaluation Engine component of the invention.

The process used to start up and initialize the Evaluation Engine is detailed in FIG. 8. Considerable care was taken to avoid "racing conditions" at startup, and the flow pictured is only one possible example of the outcome. The invention is coded so that it can start up properly regardless of the order in which other applications or processes are invoked in a multi-Thread, multi-process, multi-server environment.

First, all script files are loaded, based on system configuration, in step S237. Step S238 begins a loop process for each application registered to P.A.M. This is done through configuration files, which also include the correct loading sequence of applications. The script, once loaded in memory, is scanned to determine Instrument subscriptions, in step S239. Then step S240 begins a sub-loop for each Instrument:

If the Instrument is pre-registered (including known OS instruments, and other industry-standard interfaces such as SNMP and NT-Perfmon), the Standard Instrument Adaptor is invoked, and registered to the appropriate data in step S241. If it is not pre-registered, a continuous TCP socket connection (see U.S. patent Ser. No. 09/596,763) to the Instrument Data Server (IDS) is established per configuration in step S242. In step S243 the Engine signs into the IDS and registers for the Instrument in question. Then in step S244 it assigns the callback method to be invoked when new Instrument data is received (during runtime, this mechanism is what triggers the Instrument evaluation described in FIG. 7).

This ends the per-Instrument loop. When all Instruments are completed, this ends the per-application loop. At the end of this process the Evaluation Engine is ready to receive all relevant information from the IDS and/or other Instrument data sources.

Figure 7:
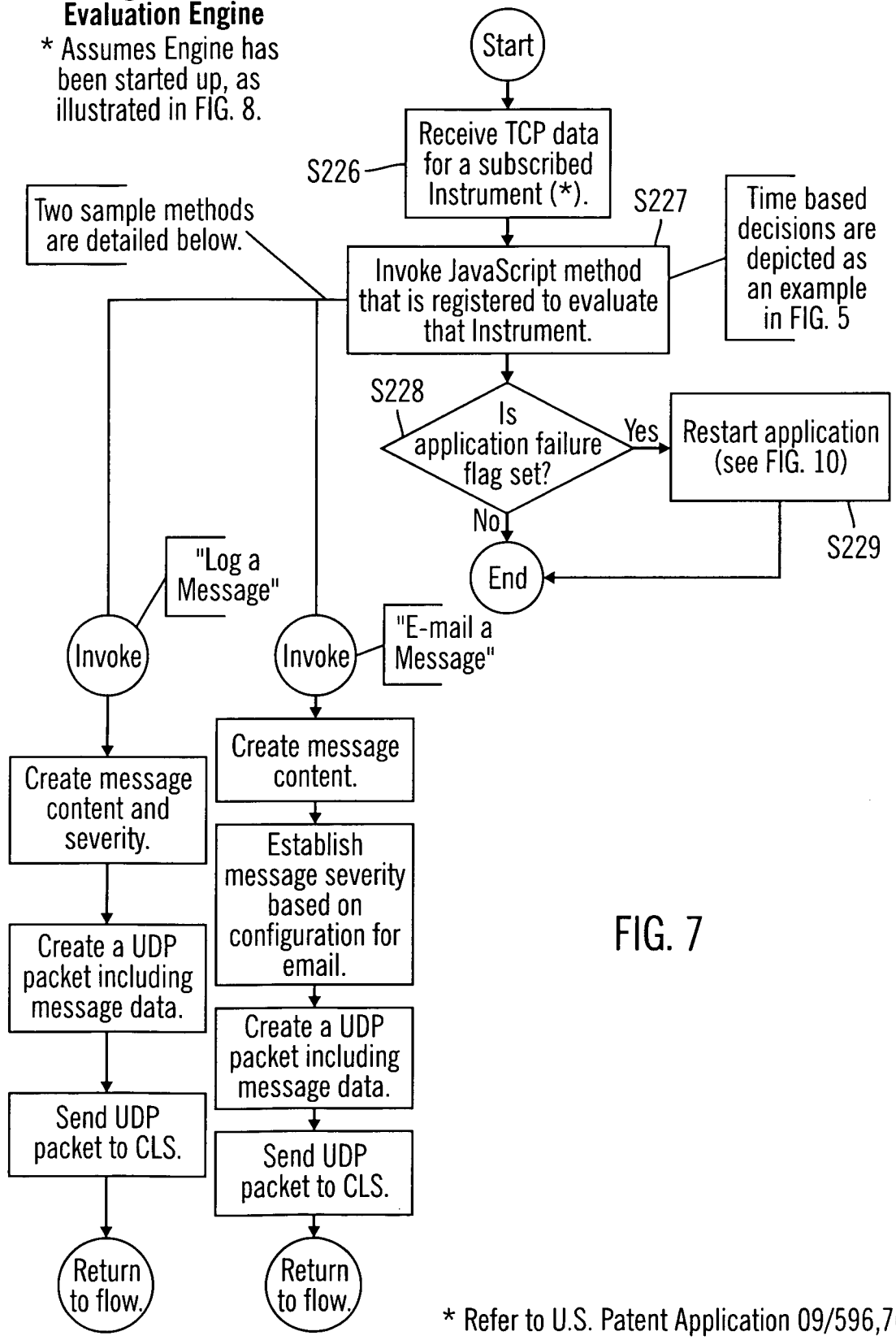
FIG. 7 is a flow diagram illustrating the process that takes place within the Evaluation Engine, once data has been received from the CLS/IDS.

One possible subscriber is the Evaluation Engine, shown in FIG. 7. After receiving the data for a subscribed instrument from the CLS/IDS in step S226 (see FIG. 5), the Engine invokes the JavaScript method which is registered to evaluate the given instrument (step S227, see also FIG. 9). If the evaluation results in the application failure flag being set in step S228, then the application will be restarted in step S229

Figure 9:
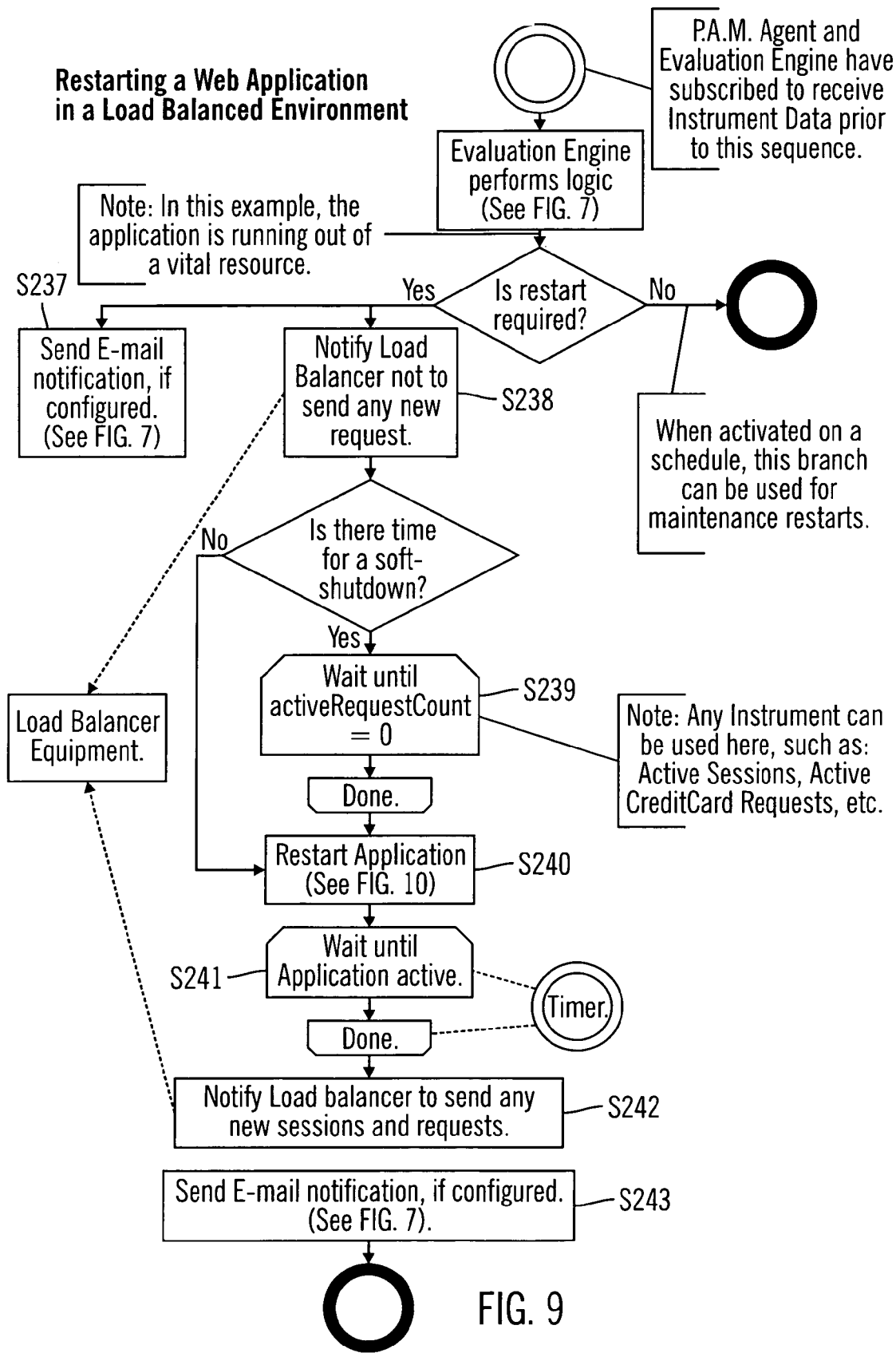
FIG. 9 is a flow diagram illustrating the process used by the invention to restart an application in coordination with load-balancing equipment, once its logical criteria have determined that a restart is needed.

(see FIG. 9). If the Evaluation logic described in FIG. 7 determines that a restart is needed, the process used by the invention to restart an application in a load-balanced environment is broken down in FIG. 9.

Figure 10:
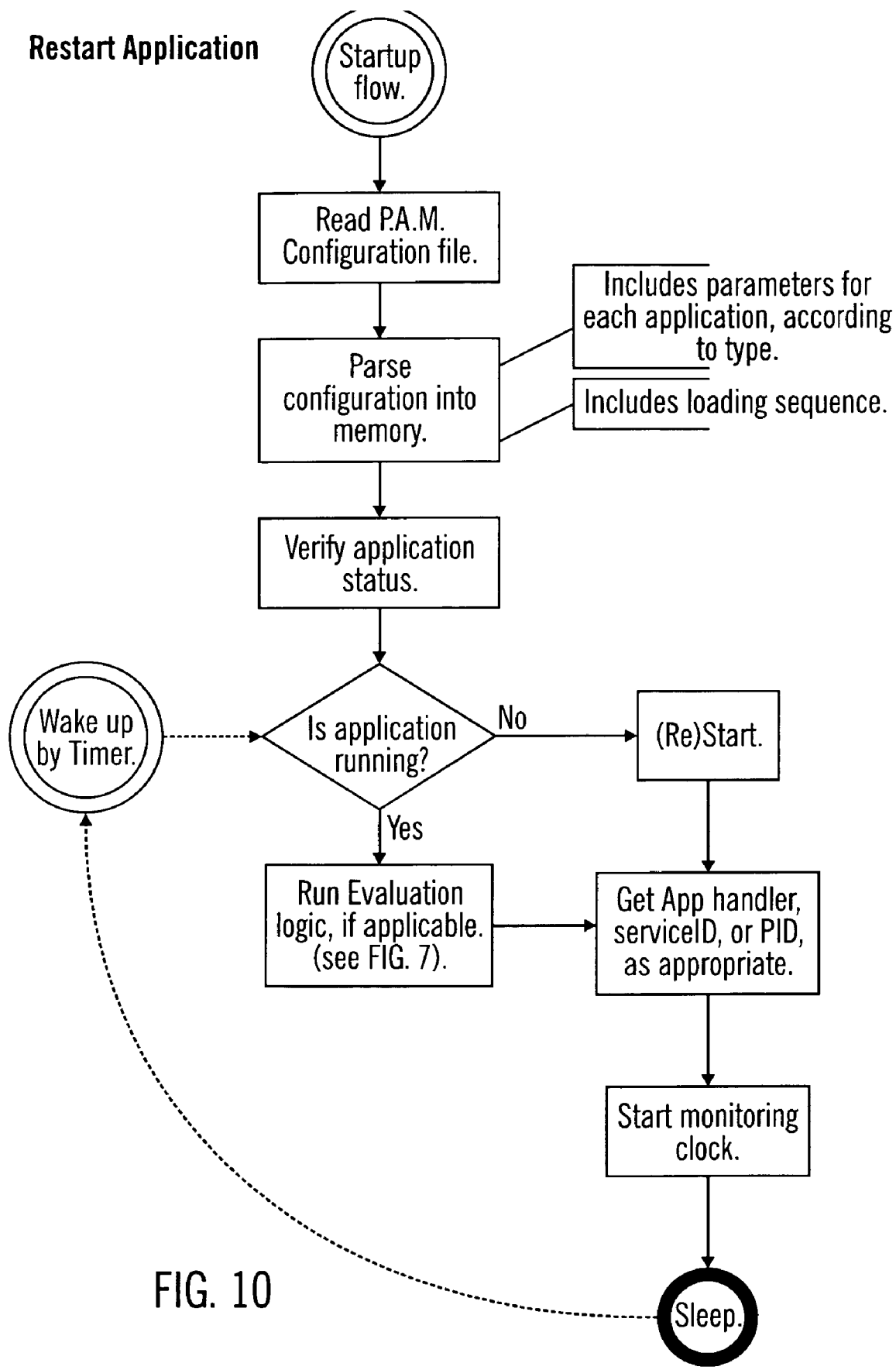
FIG. 10 is a flow diagram illustrating the processes used by P.A.M. to restart a client application.

Depending on configured settings, an email (or other) notification of the impending restart may be sent in step S237. The load balancing equipment is notified in step S238 not to send any new requests to the application. If there is time for a soft-shutdown, the invention will then monitor the specified Instrument (such as activeRequestCpount) until the application has completed all pending activity, shown in step S239. After that has been accomplished, or if there is not time to wait for a soft-shutdown, the application is restarted in step S240 (see FIG. 10). A timer event in step S241 allows time for the application to resume. In step S242 the load balancing equipment is notified that it may resume sending new sessions or requests, and (if configured) an email or other notification of the successful restart is sent in step S243.

Software Components of P.A.M.

The following description further provides enablement for a person skilled in coding to develop the codes for the various components of P.A.M., in a manner to achieve the features and functionalities of the components described above:

The Notification and Automatic Recovery Engine code is comprised of:

Code that can read configuration and properties files, and instruct the engine what processes, executables, NT services or Unix daemon processes are monitored by the engine.
   This can be achieved via any property file system.
   Example implementation in Java will use java.util.Properties Code that can monitor, start and stop NT services. (In order to simplify development it is recommended to implement a "Singleton" "DaemonProcessManager" which keeps track of all the processes managed by the system. An abstract class DeamonProcess is in turn implemented for WinServer, UnixService, etc.)
   This can be achieved by connecting to the NT operating system with a native call to the NT Service facility. (See NT operating system documentation).
   Example implementation in Java will use the JNI Native interface.

Code that can monitor, start and stop Unix daemon processes.
   This can be achieved by receiving a Process ID (PID) from the daemon script that started the program. All monitoring is done specifically per operating system by monitoring the existence and the state of the application given a PID.
   Example implementation in Java will use script calls to activate and disable a program. Simple implementation could be: process=Runtime.getRuntime( ).exec( )//use the script start option Code that can monitor, start and stop software processes as executables or under the Java Virtual Machine.
   This can be achieved by gathering the Java command line arguments from the property file and initiating the program using this data.
   Example implementation in Java will activate a program supplying parameters. Simple implementation could be:
   process=Runtime.getRuntime( ).exec( )//pass Java parameters Code that can monitor, start and stop machine-readable executable programs.
   The implantation of this feature is similar to activating Java processes, with a different name and the path to the executable itself.

Code that can read a JavaScript compliant rule file attached to each process, or assume default behavior when the file is not present.
   This can be achieved by in two steps: (1) read the file, then (2) establish default behavior.
   Example implementation in Java can use the Java.io package for loading and reading from a text-based document.

Code that evaluate and take action according to the script.
   This can be achieved by scanning the text file and interpreting its content.

In order to comply to the latest JavaScript syntax a third party JavaScript engine can be used. All custom Object and or special method implementations, such as a method email (". . . msg . . . "), need to be captured during the parsing and implemented as a part of the program.
   Example implementation in Java can use the Rhino Engine (See http://www.mozilla.org/rhino).

Code that can log script-triggered events locally, or distribute the data to a remote network server for further execution.
   Logging can be done remotely by using a TCP or UDP packet distribution or using the syslog facility provided by the Unix operating system.

Code that can subscribe to instrument data in real-time to allow evaluation via the script.
   This is done using the TCP Socket connection to a subscribing Pathways server (See U.S. patent Ser. No. 09/596,763, which had been incorporated by reference herein).

Code that enables the script to be executed in a multi-threaded environment, in order to support timer events and time-triggered actions.
   This can be achieved by applying Thread safe techniques, such as Mutex and Synchronization, to ensure Thread safety. Additional timer mechanisms need to apply in a Thread safe way. Note that many software languages provide these facilities.
   Example implementation in Java can use the synchronize { } code pattern. Java2 supplies a system level timer with and without multi-threaded synchronization. (Please refer to the specific Java implementation for more information).

Code that enables application scripts to communicate to other network devices outside the boundary of the physical host (such as routers and load balancers).
   This is done via a TCP/IP network connection that is device dependant. Packets can be sent as SNMP, HTTP, IIOP or any other communication protocol.

Code that causes a triggered action to occur based on multiple instrument data and a timed event. (This is necessary to create a meaningful evaluation of the logical state the monitored software is in).
   This can be achieved by correct scripting of the JavaScript implementation. A simple example of a registration process to an instrument in a script environment can be: function OnStartup( ){app.subscribeInstrument(type,name,callbackXYZ);} The subsequent logic to handle it could be done by using the features supplied and supported by the JavaScript language itself after the call back is made:

```
function callbackXYZ(new Value) {
    //...evaluate the new instrument value, react accordingly...
    if (newValue>5) email("we have reached level 5!");
}
```

Code that handles the racing conditions that can occur due to the varied start-up or shutdown of each of the applications. Note that these apply to the intercommunication between all the system components as well. The complexity in the code arises from the inability to pre-determine the state of any of the interlaced components during the initial setup.

This can be achieved by tracking all known hosts and processes attached to the system in a "Singleton" design pattern. Any execution of system level events may pass through the registration system to evaluate possible timing conditions.

Example implementation in Java can use static java.util.Hashtable variable within any given process. All access methods must be carefully synchronized. Inter-process communication can be done either via the Pathways TCP socket connection (as described in U.S. patent Ser. No. 09/596,763; which had been incorporated by reference herein) or via database persistence that is shared among the processes and refreshed in a timely manner.

Code that enables embedding, collecting and distributing custom Instrumentation information for effective evaluation and data archiving. All code can run in multi-threaded environments as well as multi-process environments, and similar processes run on multiple physical hosts.

This Instrumentation API code is Comprised of:

Code that assembles the Instrumentation supplied by the application Threads or multiple processes.

This can be achieved by supplying a single class, or a set of classes, that the calling software can easily access as a loaded or dynamically linked library. The calling software will need to set a value of the instrument and in some cases indicate if an immediate transmission of the value is required.

Example implementation in Java can implement an Object called Instrument with several access methods such as: setvalue( ), martStart( ), markEnd( ), increament( ) and decrement( ) to name a few. The examples given indicate the need to support setting specific values, as well as capturing a sample time and an increase/decrease in value. This is required to support programs that may not collect all the information required by the Instrument created, or information that is separated by several Objects that need to share the data. The Instrument Object hides this complexity.

Meta-data about the Instrument can be set via XML configurations. These configurations support rule-based assignment of meta-data. The meta-data includes display options in the console, sampling rate of changed values, threshold of range of values with increased sensitivity for action and more. The implementation needs to include double-buffering techniques to deal with configuration changes while processing data.

Code that support multiple run time environments (Java, Perl, MS-COM).

This can be achieved by:
        (1) Parallel implementation of the API in the different environments (this approach is difficult to maintain and therefore not recommended), or
        (2) Use the API as simply as possible to transmit a UDP formatted packet to the Central Logging Server and Instrument Data Server to manage the information. The implementation needs to create a dynamic link library, enable access methods, and transmit them as formatted UDP packets. (Note that the format follows the Unix syslog standard).

Code that contains adaptors for existing monitoring standards (SNMP, NT-Perfinon).

This can be achieved by creating a base implementation Object for external Instrumentation standards. Each implementation will extend the base class. (For SNMP, reference is made to the SNMP standard). For NT Perfinon (performance Monitor), implementation native code must be written to utilize the information supplied by the operating system. (Reference is also made to available Microsoft documentation). Note that other operating system information can be gathered in similar ways, such as using the /proc information provided with Linux and Solaris operating systems.

Code that can assemble Instrument data from all Threads and processes.

This can be achieved by any collection Object using the Singleton design pattern. Note that there needs to be a different representation on any remote host than a central machine. The implementation method is similar, however additional information (such as the host address) is used to identify the Instrument and associated action with its data.

Attention should be taken in the implementation of the collection Object to ensure fast performance. This is critical due to the potential high volume of information flow. This is achieved by fast lookups methods (such as hash maps and indexes) that enable to transform any income packet of data into a uniquely identified Instrument, represented as an Object in memory.

Example implementation in Java can use a static Java.util.Hashtable Object with the key being a String of a char Array while the elements stored represent an Instrument or any derived Object (SampleInsturment, AveregableInsturment, etc).

Code that can filter out measurements that are not subscribed for the rest of the system, that can (1) filter instrument data based on time based sampling and (2) filter instrument data based on Instrument subscription. (Subscription can be registered in three ways: hard coded, configuration option on each process, or via remote processes during runtime).

This can be achieved by the software implementation that occurs between the time that the calling software calls the setValue( ) until the time that the sendUDTPacket( ) is invoked.

Example implementation is Java could be to include a callback mechanism from a system timer at a specific interval. The execution Thread will call the method setValue( ) which will set a value locally. In cases like AveregableInsturment the value being used will be added to the going average assembled. A different Thread (using a TimerCallback mechanism) will invoke a call to the sendUDTPacket( ). The advantage of this method of implementation is the ability to add sampling in the client code before the information is sent out, therefore reducing the utilization of CPU and I/O (by reducing the number of packets being sent out).

Code that can read an XML configuration file, and set meta-data about instruments, filters, sampling rates and other configuration settings.

This can be achieved by any XML parsing library.

An advantage of using this mechanism is that it removes the need to include Instrument meta-data in the calling software.

Code that can verify the integrity of the XML document by error checking against the supplied DTD.

(Refer to the information supplied by any XML parsing program or utility).

Code that can distribute the Instrument data collected to pre-determined network servers.

This can be achieved by using the TCP or UDP transport mechanism as detailed above.

Code that can enables specification of the severity, facility, topic, verbosity and value of the Instrument and/or debugging data.

This can be achieved by:
(1) Using the generic syslog capabilities,
(2) Implementing a syslog-like utility, or
(3) Creating a new protocol to support this need (not recommended).

The implementation is similar to the Instrumentation, except that different access methods are required.

Example implementation is Java could be by creating a Log Object with static methods such as: Log.println (severity, facility, topic, verbosity, msg). In order to easily comply to the syslog API, a LogConstants Object can be created with implementation of all the standard syslog facility and severity levels.

Code that, based on the severity of the request, can use assured (TCP) or non-assured (UDP) packet delivery method (as appropriate) to transmit the data to the other network servers.

This can be achieved by establishing an abstract delivery mechanism. Final delivery method can be implemented according to logic either through configuration or at runtime. In order to enable optimum performance the preferred method is to determine the requirements during compile time. (The Preferred Embodiment described herein used UDP transmission for all inter-host transmission of both Instrumentation and logging messages. The TCP was used for Instrumentation subscription by the real-time JavaScript implementation scripts or by a Web client in the form of an Applet (See U.S. patent Ser. No. 09/596, 763; which had been incorporated by reference herein)).

Code that filters out "event storms"—multiple data events that repeat in a rapid rate during a short period of time. (This can be achieved with varying levels of complexity).

The basic method implements tracking of messages as they flow through the implementing code. Messages that repeat in rapid succession without change will be ignored.

A more complex implementation can include (1) pre-loaded known sequences of events (logs) to be treated as a single event and ignore duplicates, and/or (2) keeping track of a stack of messages so that pattern matching can be done on groups of failure events and not only a single line, and/or (3) keep the pattern matching to a specific severity, facility or topic.

Note that additional implementation needs to be done at the remote host, which uses the same techniques to correlate errors from multiple hosts. The remote host can add to this pattern matching the clustering of hosts together with severity, facility and topics to establish a known 'event storm' pattern. All known sequences are gathered in the database and distributed to each remote host via network transmission such as HTTP/GET requests at a standard interval from the remote host to a central host with database connectivity.

Instrument and logging data are routed to remote hosts, and other actions taken based on configurations of Central Logging Server and Instrument Data Server. These actions can all be modified via configuration options in XML. This data transmission methodology includes:

Code that can read the XML configuration file for data handling rules, including error checking against a supplied DTD.

This can be achieved by any XML compliant tool or utility.

Code that can route the incoming UDP and TCP information packets based on severity, topic and verbosity. Routing can be configured to any number of other hosts, including port and method of delivery (TCP, UDP).

This can be achieved by loading a configuration file that contains routing information.

Sample implementation could be the generic syslog that is supplied with most Unix systems.

Code that can write packet information to a local log file.

Code that can register Instrument data subscribers and maintain constant socket connection for a full duplex communication (see U.S. patent Ser. No. 09/596,763; which had been incorporated by reference herein).

Code that filters packet forwarding.

This is the same code that is used in the Instrumentation API—see above.

Data collected from all applications can be archived, monitored in a way that enables the system to:

A. Persist the data on a remote machine from the machine generating the data. (This enables the system to be performance friendly).

B. Archive data such that the level of data granularity can be modified over time (per second for a short time, per minute for medium term, and per hour for the long term).

This archiving protocol includes:

Code that can persist Instrument data to a database based on filtered values (filter details same as above).

This can be achieved with any data access implementation such as ODBC or JDBC.

Code that can determine the duration of time the data needs to reside in the database in different levels of granularity.

This can be achieved by adding a configuration table to the database schema which contains all rollover data points.

Code that can modify its behavior based on configuration data (how long to persist the data, data conversation rate, etc).

This can be implemented in a number of ways, including:
(1) As stored procedures in the database that are triggered by the database itself or by a system time trigger, or
(2) By a library of software Objects. (This preferred option supplies better reuse of code, and enables database independence, but may create a performance problem if not carefully implemented.)

The process and system of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the inventive concepts herein may be applied to wired or wireless system, based on the Internet, IP network, or other network technologies, for financial, informational or other applications, without departing from the scope and spirit of the present invention.

While the application manager system is described here as related primarily to Web based systems, where a distributed system makes availability difficult to manage, other embodiments may include any distributed systems that require remote monitoring and immediate action taken, while enabling only a small distraction for the calling software. Because one of the advantages to the implementation of this patent is the ability to gather filtered information from largely distributed systems, with minimum disruption to the environment in which the software is running or the network surrounding it, possible implementations can include WAP device health monitoring, appliance monitoring within a bandwidth restricted environment, etc. For instance, it is likely that in the near future all home appliances will have a chip in them to allow monitoring. But for cost consideration, it does not make sense to have full monitoring functionality built into every toaster, for example. Further, if the data is to be transmitted to a central location for monitoring, this could easily be such a huge volume as to be overwhelming. This is a clear example of a situation where the invention could be used to collect the data and filter it (perhaps at the "per home" level), transmit it, analyze it, and persist it as needed. Failure notification and perhaps features such as automatic shutdown could also be built into various points in the system.

Accordingly, it is to be understood that the invention is not to be limited by the specific illustrated embodiments, but only by the scope of the appended claims.

The invention claimed is:

1. A constant monitoring and recovery system in a distributed information exchange network environment, comprising:
   one or more digital processing devices together implementing an application host, the one or more digital processing devices structured and configured to execute the following:
      a measurement module measuring information relating to at least one of task usage, metrics and performance of a software-based application process; and
      an evaluation module evaluating measured information based on underlying logic of the process,
      wherein the measurement module and evaluation module introduce relatively low overhead to the application host.

2. A constant monitoring and recovery system as in claim 1, wherein the evaluation module is configured to evaluate the information by logic in combination with each other.

3. A constant monitoring and recovery system as in claim 1, wherein the evaluation module is configured dynamically from outside the application, and may be altered in real time.

4. A constant monitoring and recovery system as in claim 1, further comprising an initiating module real-world responses based on the results of the evaluation module.

5. A constant monitoring and recovery system as in claim 4, wherein the real-world responses comprise at least one of application restart, interaction with load balancing equipment, and failure notification.

6. A constant monitoring and recovery system as in claim 5, wherein the initiating module is configured to complete an existing process before restarting the application.

7. A constant monitoring and recovery system as in claim 1, further comprising a database that allows measured information to persist for later at least one of archival and evaluation.

8. A constant monitoring and recovery system as in claim 7, further comprising a retaining module retaining measured information at specified levels of granularity for specified periods of time.

9. An application manager system for monitoring and recovery of a software based application process, comprising:
   one or more digital processing devices, together structured and configured to execute the following:
      a monitoring module monitoring metrics and performance of the process;
      an evaluation module evaluating monitored information based on logic of the process; and
      a recovery module automatically recovering the application based on evaluated monitored information, wherein the recovery module is configured to recover the application after the existing process has been completed.

10. An application manager system as in claim 9, wherein the recovery module comprises a notification module for notifying an administrator of failure of the process.

11. An application manager system as in claim 9, wherein the monitoring module is configured to provide access into the performance of various components of the software-based application to determine various levels of functionality of the application.

12. An application manager system as in claim 11, wherein the monitoring module measures, when the application is in use, at least one of the levels of performance of actual logic of the application, and details of interactions of the monitored application with other external applications.

13. An application manager system as in claim 9, wherein the evaluation module is configured to at least one of collect, filter, aggregate, and evaluate measured information against the logic, based on specified criteria.

14. An application manager system as in claim 9, wherein the evaluation module is configured dynamically from outside the application, and may be altered in real time.

15. An application manager system as in claim 9, further comprising archival module for persisting data to be available for historical as well as real-time reporting.

16. An application manager system as in claim 9, further comprising a retaining module retaining measured information at specified levels of granularity for specified periods of time.

17. An application manager system as in claim 9, wherein the recovery module is configured to perform failure notification and recovery based on logical evaluation of monitored data, and to initiate real-world events, including at least one of restarting the application process, performing a soft shutdown to further minimize service disruption and loss of information, and sending a notification to an administrator.

18. An application manager system for constant monitoring and recovery of a software based application process, comprising:
  one or more digital processing device, together structured and configured to execute the following:
  A program interface providing set up of monitoring parameters, wherein the program interface is customizable, allowing one to instrument and monitor tasks within at least one of standard and custom code in existing programs;
  an event notification and automatic recovery evaluation engine processing information from the program interface; and
  a monitoring console server providing monitoring operations of the application manager.

19. An application manager system as in claim 18, wherein the event notification and automatic recovery evaluation engine comprises at least one of:
  a forwarding module forwarding information to the monitoring console server for archiving and data mining;
  an alerting module alerting system administrator when at least one of performance thresholds are reached and when a compete restart of a failed application is necessary; and
  a shut down module performing a soft shutdown whereby an application is stopped in stages, keeping transactions from getting lost and ensuring enterprise reliability and availability.

20. An application manager system as in claim 18, wherein the monitoring console server comprises at least one of:
  a determination module providing determination of the functionality of immediate activity and historical data;
  a personalization module creating personalized views according to individual administrative roles and security access levels;
  a remote access module selecting what information and performance data can be accessed remotely; and
  a viewing module facilitating viewing data securely in real time via a web browser.

21. An application manager system as in claim 18, wherein the program interface comprises an API.

22. An application manager system as in claim 21, wherein the API is an instrumentation API.

* * * * *